C. H. COOPER.
APPARATUS FOR CARRYING AND EXHIBITING MAPS, CHARTS, AND THE LIKE.
APPLICATION FILED AUG. 28, 1916.
1,247,227.
Patented Nov. 20, 1917.
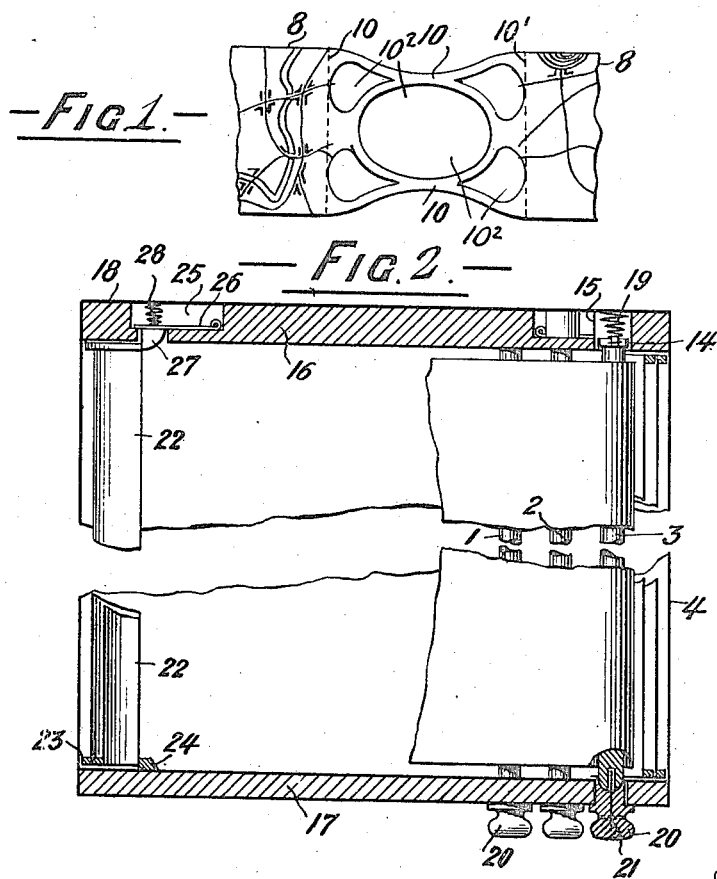

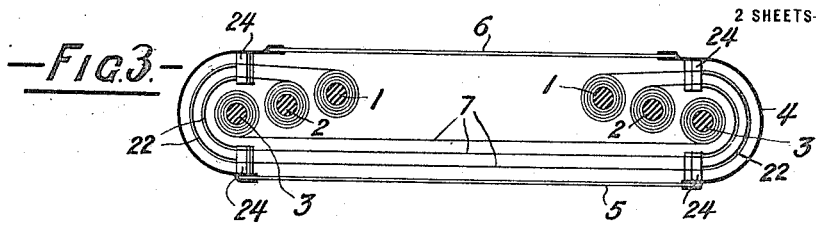
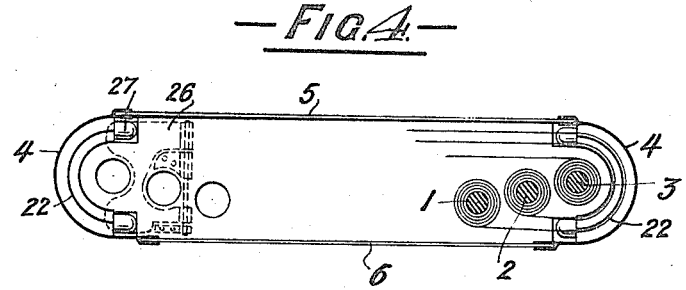
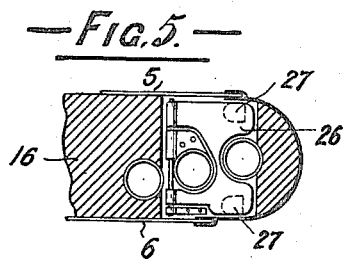
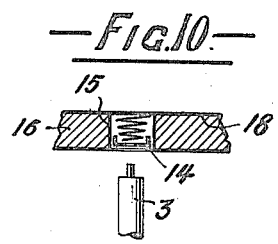
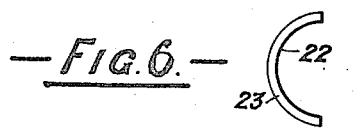
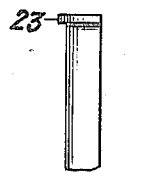
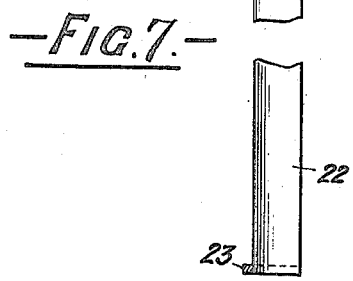

UNITED STATES PATENT OFFICE.

CHARLES HAMLET COOPER, OF WIMBLEDON, ENGLAND.

APPARATUS FOR CARRYING AND EXHIBITING MAPS, CHARTS, AND THE LIKE.

1,247,227.  Specification of Letters Patent.  Patented Nov. 20, 1917.

Application filed August 28, 1916. Serial No. 117,155.

*To all whom it may concern:*

Be it known that I, CHARLES HAMLET COOPER, subject of the King of Great Britain, residing at 15 Dora road, Wimbledon, in the county of Surrey, England, have invented certain new and useful Improvements in Apparatus for Carrying and Exhibiting Maps, Charts, and the like, and of which the following is a specification.

This invention refers to that kind of apparatus for carrying and exhibiting maps, charts, diagrams, and the like, in which the map strips are carried each by a pair of rollers, the extended lengths of the map strips between the rollers being located one behind the other and each map strip having a gap for a portion of its length through which the next rearward map strip can be observed, the map strips being traversed by rotating the carrying rollers, and the whole being contained in a case.

According to the present invention map strips are employed which are made of flexible transparent material, such as transparent celluloid, and a portion of each strip, generally the central portion, is for a suitable length left transparent, while the other portions of the strip have maps printed upon them and at which part the strips are rendered partly opaque or translucent by any suitable means, and the invention particularly refers to the combination and arrangement of parts by which such map strips are carried and operated as is hereafter described and claimed.

Referring to the drawings:

Figure 1 shows in elevation a portion of one of the map strips to be contained in the case hereafter described.

Fig. 2 shows in sectional elevation a case containing map strips which are carried over a series of curved guides at each end of the case, and Fig. 3 is a horizontal section of the apparatus shown at Fig. 2.

Fig. 4 is an inverted horizontal section of Fig. 2 showing the interior of the upper part of the case, and Fig. 5 is a horizontal section of a portion of the upper part of the case shown at Fig. 2 to better illustrate the means for locking in position the upper ends of the concentric curved guides.

Fig. 6 is a plan view, and Fig. 7 an elevation partly in section of an outer curved guide detached, and Figs. 8 and 9 are similar views showing an inner curved guide.

Fig. 10 is a detached sectional elevation showing on a larger scale, the means for removably supporting one end of a map strip roller.

Referring particularly to Figs. 1, 2 and 3 of the drawings, the apparatus or case for carrying and exhibiting maps, charts and the like according to this invention consists of the desired number of pairs of rollers, such as the three pairs of rollers 1, 2 and 3 shown at Fig. 3, which rollers are revolubly and detachably mounted, as hereafter described, in a case 4 having a transparent front 5 and a removable back 6, which latter may be made to slide in guides to close the rear of the case. The back 6 of the case may carry any well known or convenient devices (not shown in the drawings) by which the case can be secured to any convenient support, and the interior of the case may be fitted with electric lamps behind the map strips.

Each pair of rollers carries a map strip 7, Fig. 3, extending from roller to roller over guides hereinafter described, which guides form part of the present invention, and a portion of such a map strip is shown at Fig. 1. The map strip, Fig. 1 is conveniently formed of flexible, transparent material, such as transparent celluloid, and the central portion 10 between the dotted lines 10'—10' for a suitable length of the strip is left transparent, while both the end portions have maps printed upon them and where the maps are printed the celluloid is rendered partly opaque or translucent by any suitable or well known means such as a coat of paint on the back of the strip, and therefore the strip presents, as will be now understood, portions 8 having maps, and a central portion 10 which is transparent and preferably has apertures $10^2$ formed in it as shown in Fig. 1 to constitute as it were a skeleton section, and obviously through this transparent skeleton portion 10 any other map strip lying beneath can be readily observed.

The map strips 7, Fig. 3, being arranged one underlying another and beneath the transparent cover 5, it will be quite clear that if the map strip extending between the rollers 1, Fig. 3, is traversed by turning the rollers until the transparent portion of the map strip is above the underlying map strip, this latter map can be inspected.

The rollers 1, 2 and 3, as aforesaid, are to be revolubly carried within the case 4 so that they can be not only readily inserted and removed but also so that no projecting parts extend within the case when the rollers are removed. To this end one end of each roller as shown on the right hand side of Fig. 2 at the upper part thereof and more clearly shown at Fig. 10, has a projecting pin which, when the roller is inserted, is caused to enter a central bore in a cup-like washer 14, which washer is slidable within a tube 15, the tube having an inward flange at its interior end which prevents the washer 14 leaving the tube 15.

The wooden top 16 and base 17 are shown at Fig. 2, the top plate 16 being covered by a thin metal plate 18, and at Fig. 10 a spiral spring 19 acts between the plate 18 and the cup-shaped washer 14.

At the opposite and lower end each roller is formed with a rounded end having a cross slot, while a knob 20 capable of freely revolving about its axis but not of endway motion is fitted and carried in the base 17, the knob having at its inner end a recess to receive the rounded end of the roller, while a blade 21 extends from the inner end of the knob stem.

With such a construction, to insert a roller it is only necessary first to enter the upper central pin of the roller into the central bore of the cup washer 14, then to press the washer upward into its carrying tube 15 until the lower end of the roller 3 can be dropped into the recess in the knob 20 so that the blade 21 enters the cross slot in the end of the roller, and then the roller will be securely held while it can be revolved in either direction by the operator through the medium of the knob 20.

The strips are guided by means now to be described with reference to Figs. 2 to 10, so that the straight portions of the strips, as shown, are located one behind another adjacent to the transparent front 5, while, as will be observed, the distance between the exposed surface of one map strip and the similar surface of another map strip is small and remains constant, while an equal area of each map can be exposed to view through the front 5.

To effect this result I employ semicircular guides such as 22, Figs. 6 to 9, each guide having formed upon or fixed to its opposite ends, flanges such as 23.

Fixed to the interior of the base plate 17 there are two stops 24, Figs. 2 and 3, while the top plate 16, Figs. 2, 4, and 5, carries in a recess 25 a hinged door 26, upon the free end of which door there are two projections 27 which are more fully shown at Figs. 4 and 5, and a spiral spring or springs 28 acts or act against the door to normally maintain the projections 27 so that they extend slightly into the interior of the case.

The top plate 16 is covered with a thin metal sheet 18 which can be removed to fit the door 26 and which serves to retain the spring 28. With this construction the lower end of the outer guide can be inserted so that its end comes behind the stops 24, and then the upper end of that guide can be pushed back until it snaps past the projections 27, and is thus held firmly and immovably in position, and then the next inner guide can be similarly inserted and secured. Only two such guides have been illustrated, but it is obvious that any desired number can be employed, and the guides have been specifically described upon one end of the case, but it must be understood that precisely similar guides similarly held are to be fitted into the opposite end of the case.

The door 26 as will be observed at Fig. 5 is so formed that it does not interfere with the devices for carrying the ends of the rollers.

With this construction, should it be desired to remove the map-carrying rollers, the case is moved off the back plate 6, and then the rollers 1 and 2 still having the ends of the map strips fixed thereto can be dismounted from their bearings in the case, and brought out therefrom; and then the rollers 3 can be dismounted and entirely removed with the strip which they carry. By then pressing upward the door 26 the upper end of the inner guide 22 can be released and that guide removed by simply lifting its lower end away from behind the stops 24, and the map strip, the ends of which are carried by the rollers 2, can be taken away from the case. Similarly those guides 22, over which the map strip carried by the rollers 1 passes, can be removed and that map strip also taken away.

The maps and guides can be replaced by simply reversing the order of operations just described. By the map strip carried by the roller 1 passing externally over the outer guides 22 and the next inner map strip carried by the rollers 2 passing externally over the next inner guide 22, and so on, it will be observed that the extended length of the map strips can be brought very close together, while owing to the construction of the guides the areas of the map strips exposed to view may be always equal one to another.

In some cases the guides need not be precisely concentric, nor is it absolutely essential that the edges of a set of guides shall be in the same plane, since the edges of one guide may stand slightly behind the edges of the next guide.

What I claim as my invention and desire to secure by Letters Patent is:—

1. An apparatus for carrying and exhibiting maps, charts, and the like, comprising in combination a case, a transparent front to said case, a plurality of pairs of revoluble rollers located within said case, a flexible map strip carried by each pair of rollers, a set of concentrically arranged curved guides corresponding in number to the number of pairs of rollers located at each end of said case with the concave surfaces of said guides facing toward the said rollers and parallel therewith, means for distancing the said guides of each set one from the other, flexible map strips extending between pairs of rollers each map strip passing from the first roller of a pair over the convex surface of one of said curved guides at one end of said case extending across said case beneath said transparent front and passing over the convex surface of one of said guides at the opposite end of said case and to the second roller of said pair, said extending portions of said map strips between said guides being adjacent to and parallel with one another, each map strip comprising a map printed upon a substantially opaque portion while another portion of said strip is transparent, and means extending to the exterior of said case for revolubly adjusting said rollers to bring the transparent portion of an overlying map strip into position to enable an underlying map strip to become visible.

2. An apparatus for carrying and exhibiting maps, charts, and the like, comprising in combination a case, a transparent front to said case, pairs of revoluble rollers located within said case, a flexible map strip carried by each pair of rollers, substantially concentrically arranged semicircular guides distanced from each other extending parallel with said rollers and located at each end of said case, the convex surfaces of said guides arranged to face the ends of said case, means for fixing said guides singly in position in said case and for removing said guides therefrom, flexible map strips extending between pairs of rollers each map strip passing from the first roller of a pair over the convex surface of one of said curved guides at one end of said case extending across said case beneath said transparent front and passing over one of said guides at the opposite end of said case and to the second roller of said pair, said extending portions of said map strips between said guides being adjacent to and parallel with one another, each map strip comprising a map printed upon a substantially opaque portion while another portion of said strip is transparent, and means extending to the exterior of said case for revolubly adjusting said rollers to bring the transparent portion of an overlying map strip into position to enable an underlying map strip to become visible.

3. An apparatus for carrying and exhibiting maps, charts, and the like, comprising in combination a case, a transparent front to said case, pairs of revoluble rollers located within said case, a flexible map strip carried by each pair of rollers, similar semicircular guides located at each end within the case on the outer sides of said rollers and extending parallel with same, each guide consisting of a sheet bent into semicircular form and having at its opposite ends flanges extending from its convex surface to distance one guide from the next guide and preserve the guides concentric, stop pieces in the interior of the case at the base thereof to retain the lower ends of said guides in position, hinged doors at the top of the case each having inward projections to take in front of the upper ends of said curved guides to retain same in position with their convex surfaces facing the ends of said case, flexible map strips extending between pairs of rollers each map strip passing from the first roller of a pair over one of said curved guides at one end of said case extending across said case beneath said transparent front and passing over one of said guides at the opposite end of said case and to the second roller of said pair, said extending portions of said map strips between said guides being adjacent to and parallel with one another, each map strip comprising a map printed upon a substantially opaque portion while another portion of said strip is transparent, and means extending to the exterior of said case for revolubly adjusting said rollers to bring the transparent portion of an overlying map strip into position to enable an underlying map strip to become visible.

4. An apparatus for carrying and exhibiting maps, charts, and the like, comprising in combination a case, a transparent front to said case, pairs of revoluble rollers located within said case, a flexible map strip carried by each pair of rollers, similar semicircular guides located at each end within the case on the outer sides of said rollers and extending parallel with same, each guide consisting of a sheet bent into semicircular form and having at its opposite ends flanges extending from its convex surface to distance one guide from the next guide and preserve the guides concentric, stop pieces in the interior of the case at the base thereof to retain the lower ends of said guides in position, hinged doors at the top of the case each having inward projections to take in front of the upper ends of said curved guides to retain same in position with their convex surfaces facing the ends of said case, flexible map strips extending between pairs of rollers each map strip passing from the first roller of a pair over one of said curved guides at one end of said case extending across said case beneath said transparent front and passing over one of said guides at the opposite end of said case and to the second roller of said pair, said extending portions of said map strips between said guides being adjacent to and parallel with one another, each map strip comprising a map printed upon a substantially opaque portion while another portion of said strip is transparent, means extending to the exterior of said case for revolubly adjusting said rollers to bring the transparent portion of an overlying map strip into position to enable an underlying map strip to become visible, and means to enable said revoluble rollers to be removed from said case and replaced therein to permit the map strips to be exchanged.

In witness whereof I have hereunto set my hand in the presence of two witnesses.

CHARLES HAMLET COOPER.

Witnesses:
THOMAS WILLIAM ROGERS,
WILLIAM A. MARSHALL.